(12) United States Patent
Saruwatari

(10) Patent No.: US 7,218,458 B2
(45) Date of Patent: May 15, 2007

(54) ZOOM LENS SYSTEM AND IMAGE PICKUP APPARATUS WITH THE SYSTEM

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/378,090

(22) Filed: Mar. 17, 2006

(65) Prior Publication Data
US 2006/0221460 A1    Oct. 5, 2006

(30) Foreign Application Priority Data
Apr. 1, 2005    (JP) ............................. 2005-106353

(51) Int. Cl.
*G02B 15/14* (2006.01)
(52) U.S. Cl. ................. 359/686; 359/676; 359/689
(58) Field of Classification Search ............. 359/676, 359/686–688, 689–690
See application file for complete search history.

(56) References Cited

U.S. PATENT DOCUMENTS

| 5,268,790 A | 12/1993 | Chen |
| 5,790,321 A | 8/1998 | Goto |
| 5,847,882 A | 12/1998 | Nakayama |
| 6,157,488 A | 12/2000 | Ishii |
| 6,166,864 A | 12/2000 | Horiuchi |
| 6,606,200 B1 | 8/2003 | Nakayama et al. |
| 2003/0076591 A1 | 4/2003 | Ohmori |

FOREIGN PATENT DOCUMENTS

| JP | 6-324262 A | 11/1994 |
| JP | 8-5913 A | 1/1996 |
| JP | 9-127322 A | 5/1997 |
| JP | 11-52238 A | 2/1999 |
| JP | 11-305124 A | 11/1999 |
| JP | 11-305126 A | 11/1999 |
| JP | 2000-267005 A | 9/2000 |

*Primary Examiner*—Scott J. Sugarman
*Assistant Examiner*—Darryl J. Collins
(74) *Attorney, Agent, or Firm*—Canon USA, Inc. Intellectual Property Division

(57) ABSTRACT

At least one exemplary embodiment is directed to a zoom lens system, which can have a diffractive optical element, achieves high optical performance over a wide zoom range. The zoom lens system includes a first lens unit having positive optical power, a second lens unit having negative optical power, and a rear lens component including at least one lens unit having positive optical power. The first lens unit, the second lens unit, and the rear lens component are arranged in that order from an object side towards an image side of the zoom lens system. The diffractive optical element is included in the first lens unit. The rear lens component is provided with a positive lens element having extraordinary dispersion characteristics.

10 Claims, 10 Drawing Sheets

ZOOM LENS SYSTEM AND IMAGE PICKUP APPARATUS WITH THE SYSTEM

BACKGROUND OF THE INVENTION

1. Field of the Invention

The present invention relates to zoom lens systems and image pickup apparatuses equipped with such systems.

2. Description of the Related Art

Compact, high-resolution zoom lens systems having a wide angle of view to be used as photographic optical systems in image pickup apparatuses that apply solid-state image sensors have been, in recent years, in great demand. Such image pickup apparatuses can be, for example, a video camera, a digital still camera, a broadcast camera, or a silver film camera, or other image pickup apparatus as known by one of ordinary skill in the relevant art or equivalents. For example, in video cameras, the demand for recording high-definition still images in addition to moving pictures is growing, and therefore, a compact lens system with high optical performance is in great demand.

To meet these demands, there are conventional rear-focusing zoom lens systems (for example, see Japanese Patent Laid-Open Nos. 11-305124 (corresponding to U.S. Pat. No. 6,166,864), 8-5913 (corresponding to U.S. Pat. No. 5,847,882), and 2000-267005). Such systems perform focusing by moving a lens unit other than a first lens unit disposed most proximate to an object.

Generally, in comparison to zoom lens systems that perform focusing by moving the first lens unit, the first lens unit in a rear-focusing zoom lens system has a smaller effective diameter. For this reason, the entire lens system is readily reduced in size. Moreover, rear-focusing zoom lens systems are more suitable for close-up photography and macro-photography. Furthermore, rear-focusing zoom lens systems can require only a small amount of driving force for moving the lens unit for focusing since the lens unit can be small and lightweight. Therefore, a focusing operation in rear-focusing zoom lens systems can be performed very quickly.

According to the zoom lens systems discussed in Japanese Patent Laid-Open Nos. 11-305124 and 8-5913, the degree of axial chromatic aberration (longitudinal chromatic aberration) and transverse chromatic aberration (lateral chromatic aberration) is large especially at the telephoto end. For this reason, if these zoom lens systems are to be used in apparatuses that require high resolution and high image quality, such as a digital still camera, these chromatic aberrations become visible.

On the other hand, according to the zoom lens system discussed in Japanese Patent Laid-Open No. 2000-267005, these chromatic aberrations are properly corrected or the error reduced by providing the first lens unit with a lens composed of extraordinary dispersion glass.

Recently, techniques for reducing chromatic aberration in an optical system have been discussed where reduction can be achieved by providing a diffractive optical element in the optical system (for example, see Japanese Patent Laid-Open No. 6-324262 (corresponding to U.S. Pat. No. 5,790,321), U.S. Pat. No. 5,268,790, Japanese Patent Laid-Open No. 11-52238 (corresponding to U.S. Pat. No. 6,606,200), and Japanese Patent Laid-Open No. 11-305126 (corresponding to US AA2003076591)).

If a diffractive optical element is to be used in a photographic system (optical system), a sufficient diffraction efficiency can be attained over the entire visible range. Generally, with only a single-layer diffraction grating, the diffraction efficiency is lowered at wavelengths other than the design wavelength, thus producing undesired diffraction rays of orders other than the design order. This can induce color flare. In view of this, Japanese Patent Laid-Open No. 9-127322 (corresponding to U.S. Pat. No. 6,157,488), for example, discusses a diffractive optical element that includes a plurality of diffraction gratings. Specifically, a material of each diffraction grating and the thickness of each diffraction grating are optimally selected so that a diffractive optical element with high diffraction efficiency over the entire visible range is achieved.

Generally, by increasing the refractive power of each lens unit of a zoom lens system, the entire lens system can be reduced in size and be given a high zoom ratio due to a reduced moving amount of each lens unit for a zooming operation. However, it can be difficult to attain high optical performance since the displacement amount of each aberration, especially the chromatic aberration, increases during the zooming or focusing operation.

For example, in a zoom lens system having a high zoom ratio of 10× or more, if a diffractive optical element is incorporated into the first lens unit to correct the chromatic aberration, there are cases where the angle of light incident on the diffractive optical element changes significantly in response to a change in the angle of view or the focal length. Therefore, it can be necessary in some circumstances to consider the appropriate positioning of the diffractive optical element in order to reduce undesired diffraction rays.

Furthermore, if the chromatic aberration of the entire lens system is to be corrected or reduced solely with a diffractive optical element, it can be difficult to correct the chromatic aberration over the entire zoom range to achieve high quality images while still attaining a high zoom ratio.

Therefore, in order to achieve high optical performance by having the ability to properly correct the chromatic aberration over the entire zoom range from the wide-angle end to the telephoto end while attaining a high zoom ratio, it can be useful to select the appropriate position of the diffractive optical element in the optical system and appropriate materials of optical elements included in the optical system.

SUMMARY OF THE INVENTION

At least one exemplary embodiment is directed to a zoom lens system and/or image pickup apparatus equipped with such systems (e.g., a zoom lens system that is applicable to, for example, a video camera, a digital still camera, or a silver film camera).

At least one exemplary embodiment is directed to a zoom lens system that has high optical performance over a broad zoom range.

A zoom lens system according to an exemplary embodiment includes a first lens unit having positive optical power (reciprocal of the focal length); a second lens unit having negative optical power; and a rear lens component including at least one lens unit having positive optical power. The first lens unit, the second lens unit, and the rear lens component are arranged in that order from an object side towards an image side of the zoom lens system. The first lens unit includes a diffractive optical portion. The rear lens component includes a positive lens element that satisfies the conditional formula $\nu p \cdot \theta gF > 38$, where $\nu p$ represents an Abbe number of a material of the positive lens element, and $\theta gF$ represents a partial dispersion ratio of the material of the positive lens element.

Further features of the present invention will become apparent from the following description of exemplary embodiments.

DESCRIPTION OF THE EMBODIMENTS

Figure 1:
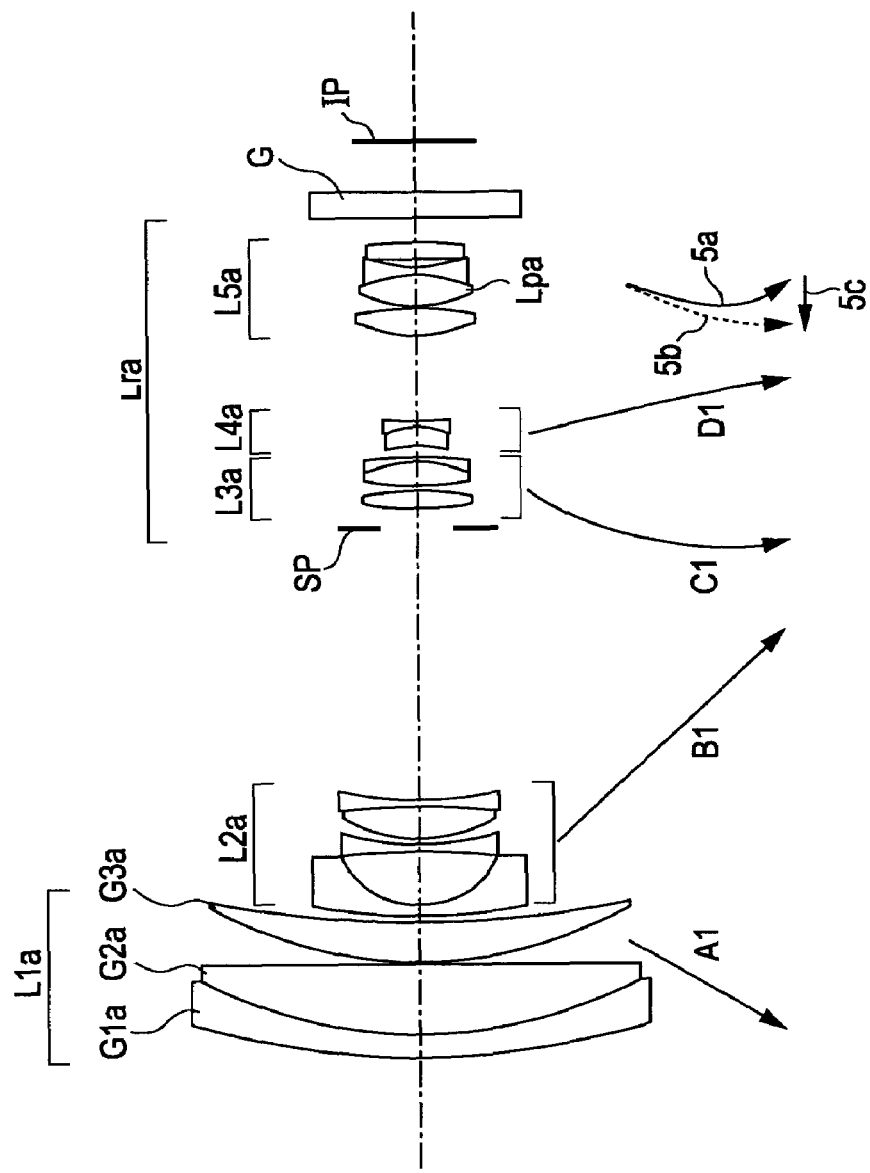
FIG. 1 is a cross-sectional view of a zoom lens system according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

A zoom lens system and an image pickup apparatus equipped with the zoom lens system according to embodiments will now be described.

Figure 2:
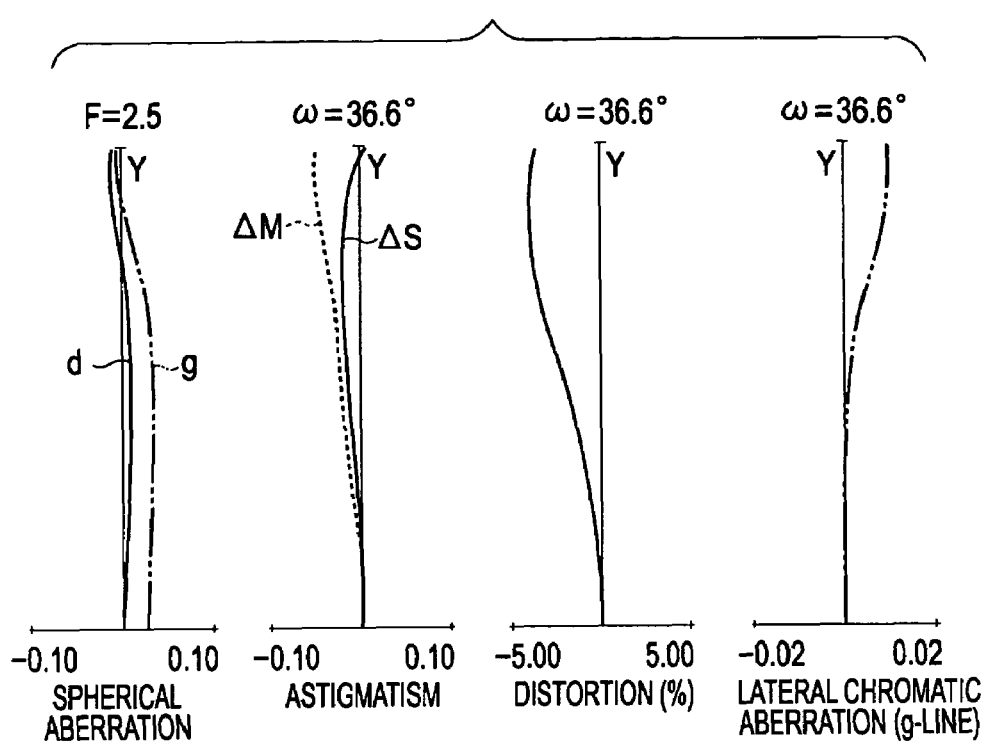
FIG. 2 illustrates aberrations of the zoom lens system according to the first exemplary embodiment at the wide-angle end.
Figure 3:
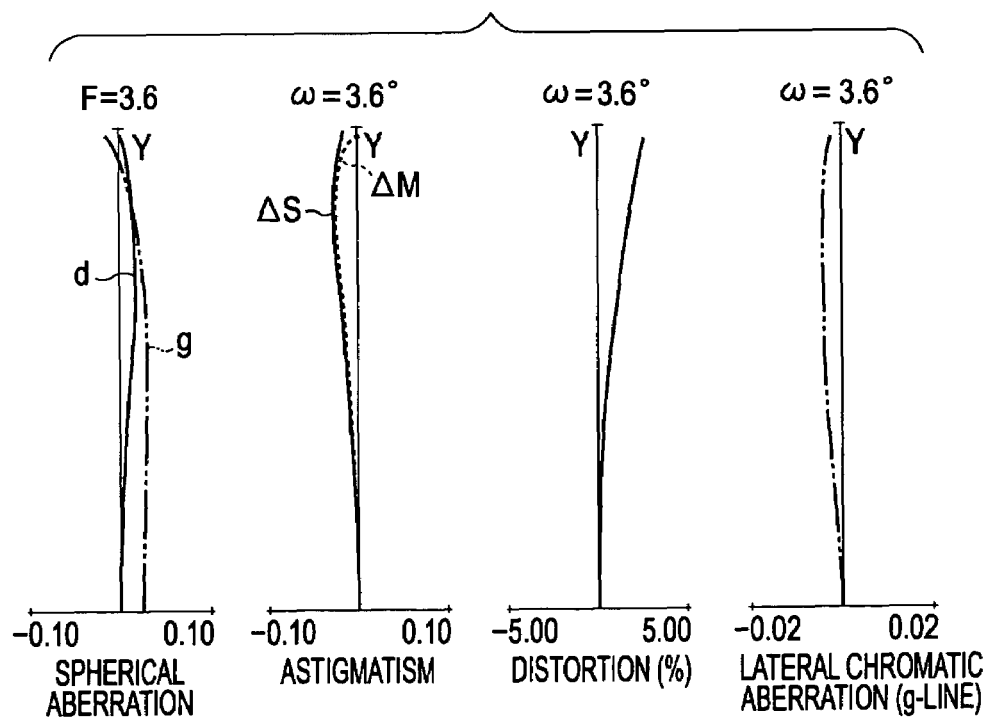
FIG. 3 illustrates aberrations of the zoom lens system according to the first exemplary embodiment at the telephoto end.

FIG. 1 is a cross-sectional view of a zoom lens system according to a first exemplary embodiment at the wide-angle end. FIGS. 2 and 3 respectively illustrate aberrations of the zoom lens system according to the first exemplary embodiment at the wide-angle end and the telephoto end respectively.

Figure 4:
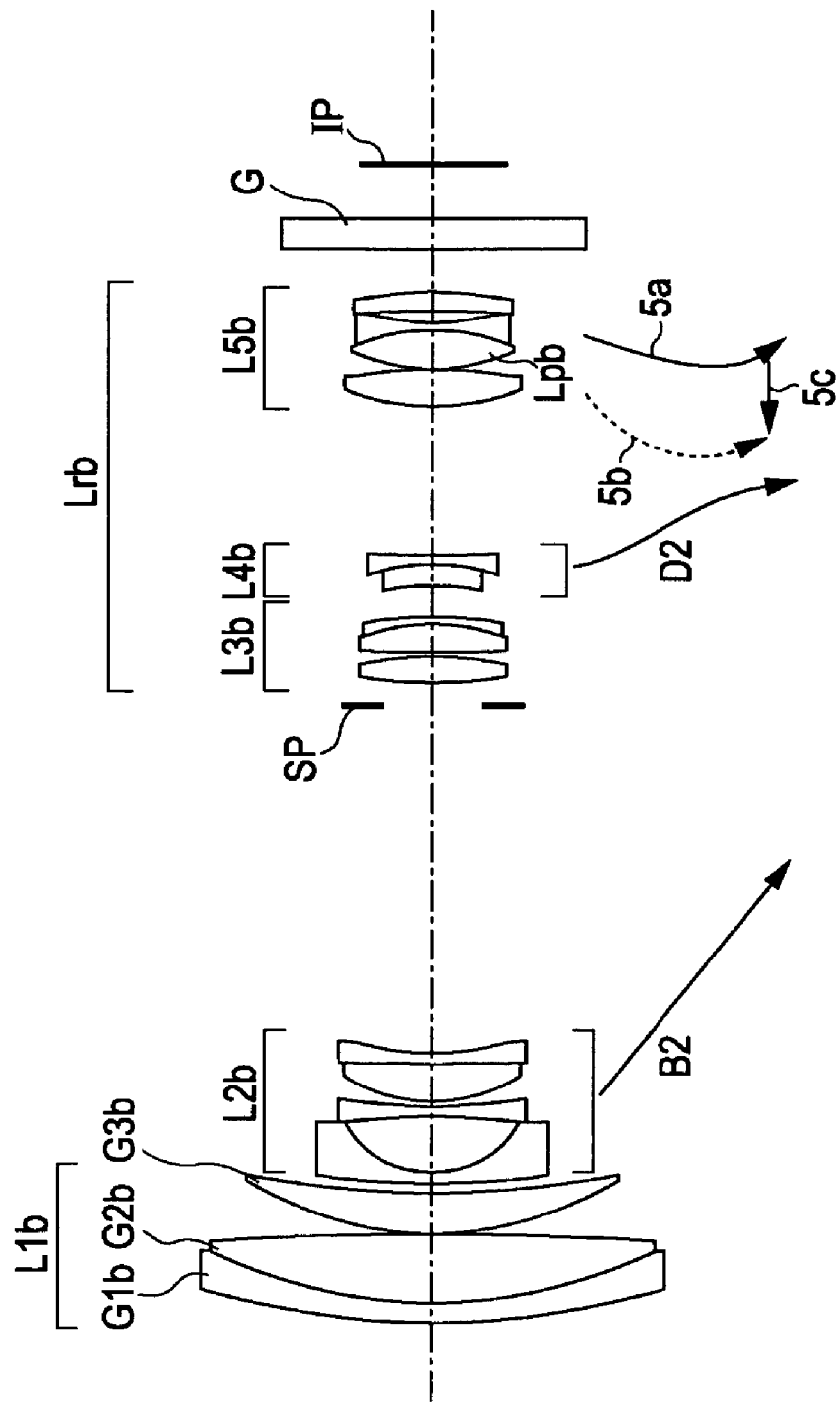
FIG. 4 is a cross-sectional view of a zoom lens system according to a second exemplary embodiment.
Figure 5:
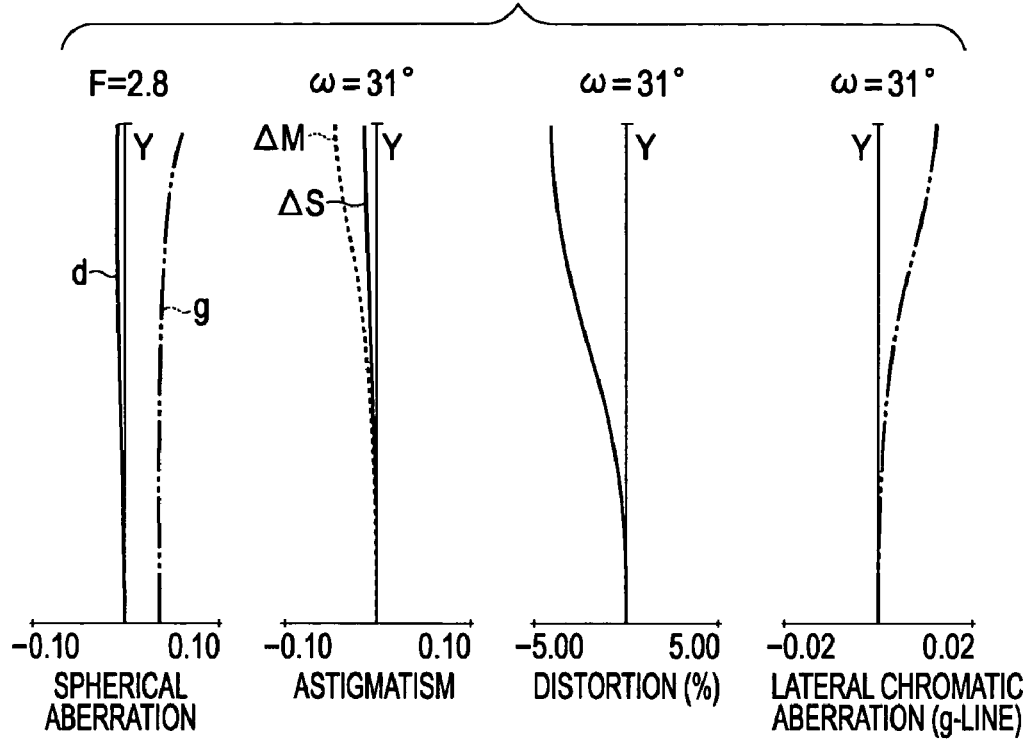
FIG. 5 illustrates aberrations of the zoom lens system according to the second exemplary embodiment at the wide-angle end.
Figure 6:
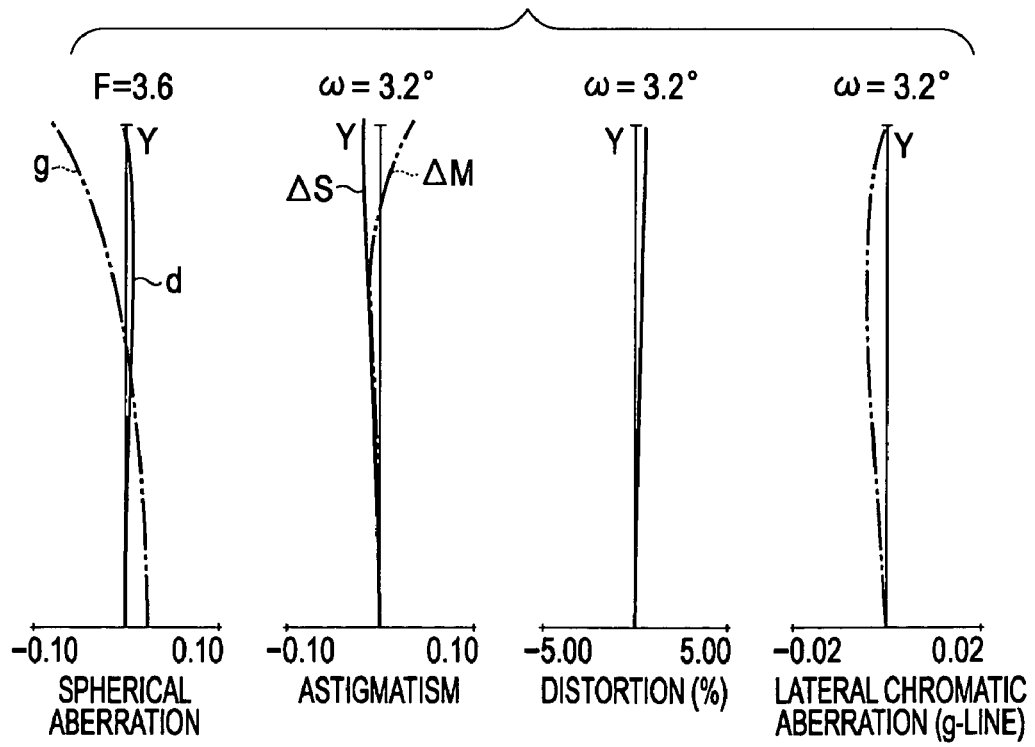
FIG. 6 illustrates aberrations of the zoom lens system according to the second exemplary embodiment at the telephoto end.

FIG. 4 is a cross-sectional view of a zoom lens system according to a second exemplary embodiment at the wide-angle end. FIGS. 5 and 6 respectively illustrate aberrations of the zoom lens system according to the second exemplary embodiment at the wide-angle end and the telephoto end respectively.

Figure 7:
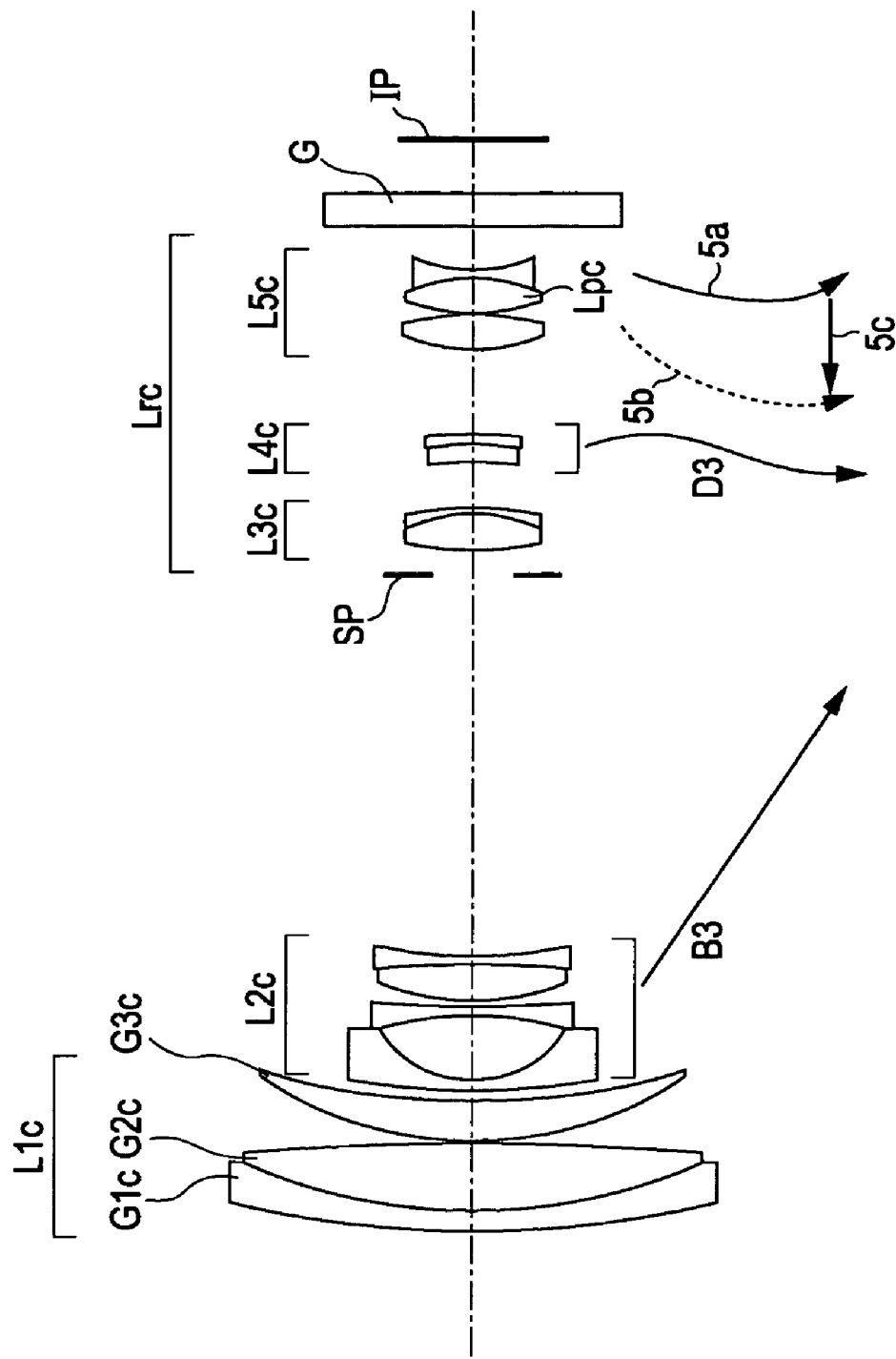
FIG. 7 is a cross-sectional view of a zoom lens system according to a third exemplary embodiment.
Figure 8:
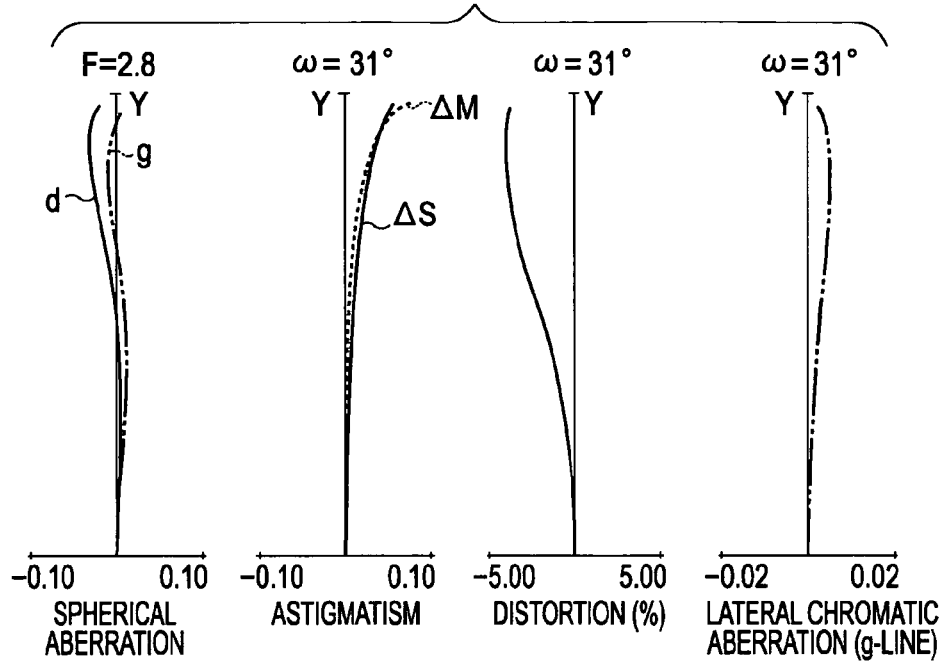
FIG. 8 illustrates aberrations of the zoom lens system according to the third exemplary embodiment at the wide-angle end.
Figure 9:
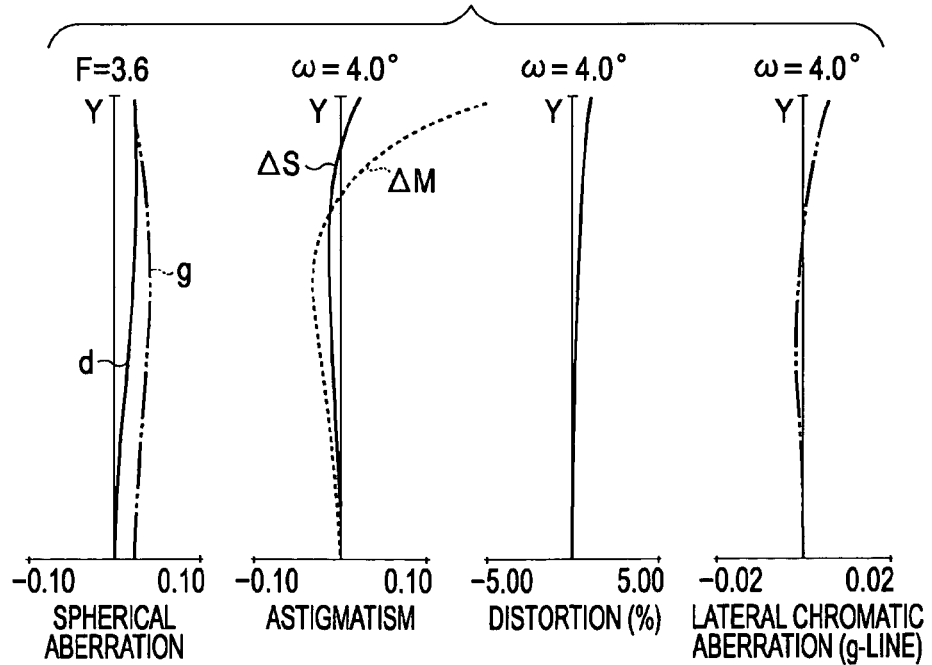
FIG. 9 illustrates aberrations of the zoom lens system according to the third exemplary embodiment at the telephoto end.

FIG. 7 is a cross-sectional view of a zoom lens system according to a third exemplary embodiment at the wide-angle end. FIGS. 8 and 9 respectively illustrate aberrations of the zoom lens system according to the third exemplary embodiment at the wide-angle end and the telephoto end respectively.

Figure 10:
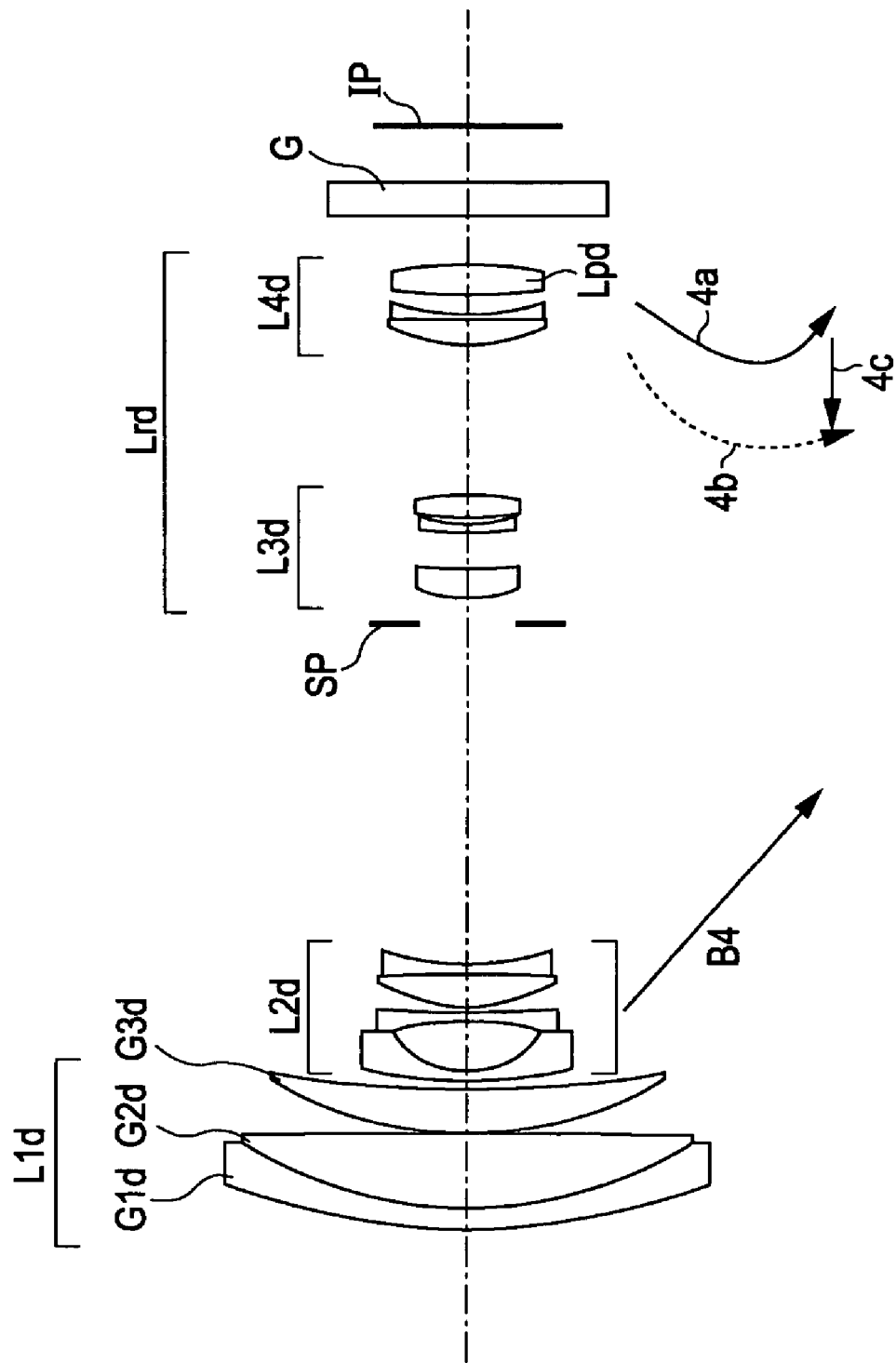
FIG. 10 is a cross-sectional view of a zoom lens system according to a fourth exemplary embodiment.
Figure 11:
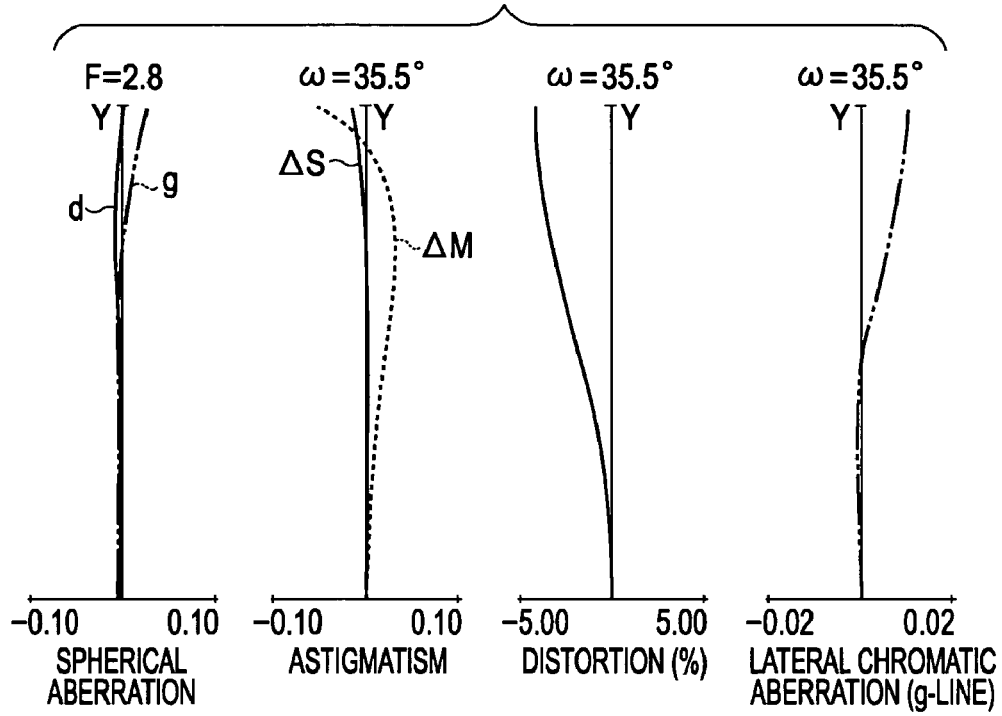
FIG. 11 illustrates aberrations of the zoom lens system according to the fourth exemplary embodiment at the wide-angle end.
Figure 12:
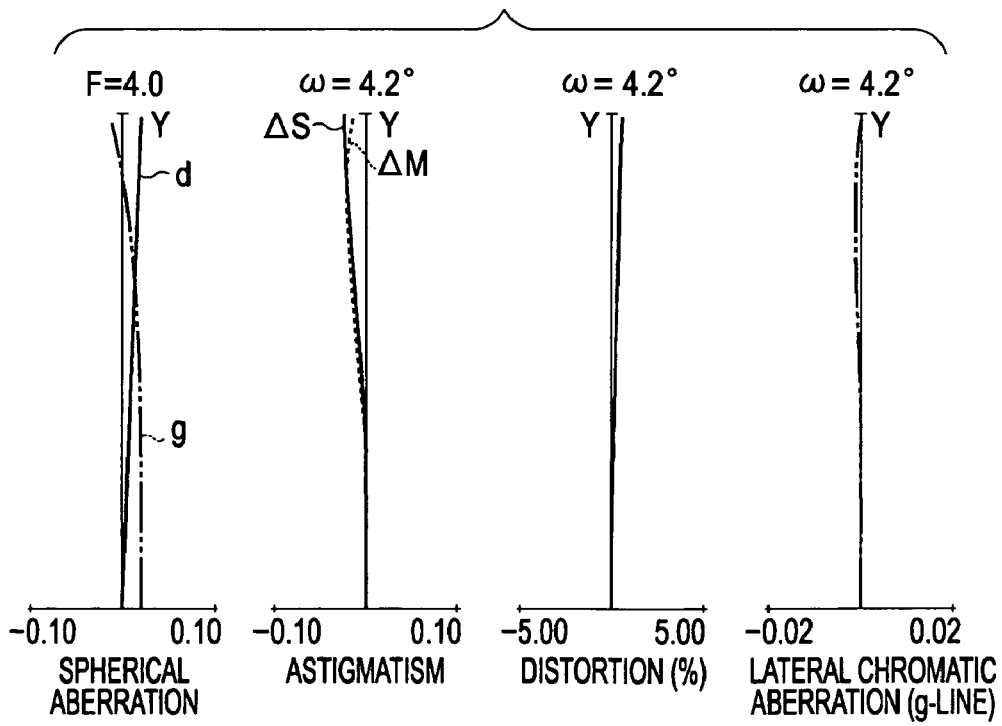
FIG. 12 illustrates aberrations of the zoom lens system according to the fourth exemplary embodiment at the telephoto end.

FIG. 10 is a cross-sectional view of a zoom lens system according to a fourth exemplary embodiment at the wide-angle end. FIGS. 11 and 12 respectively illustrate aberrations of the zoom lens system according to the fourth exemplary embodiment at the wide-angle end and the telephoto end respectively.

Figure 13:
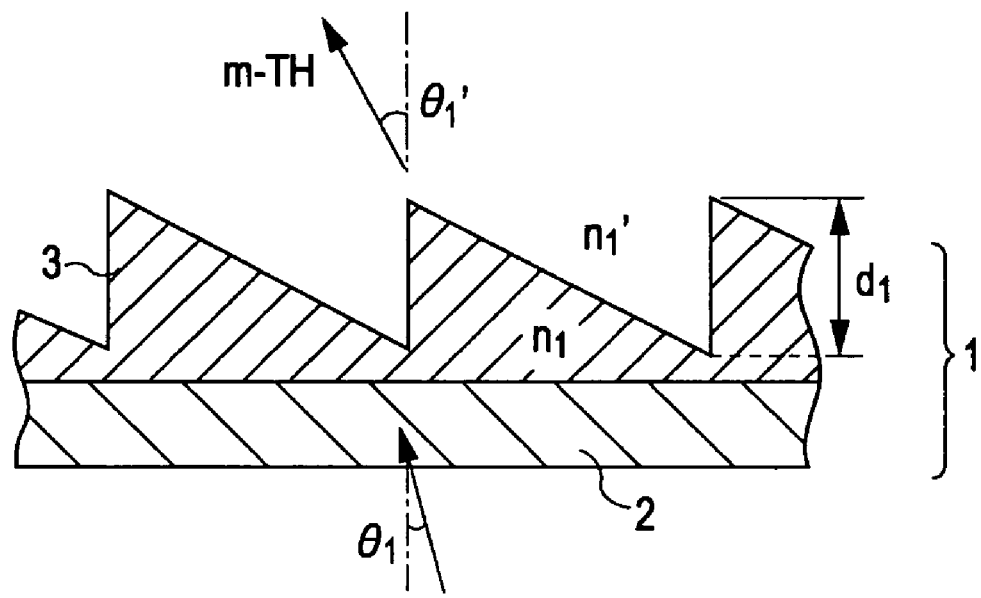
FIG. 13 illustrates a diffractive optical element.
Figure 14:
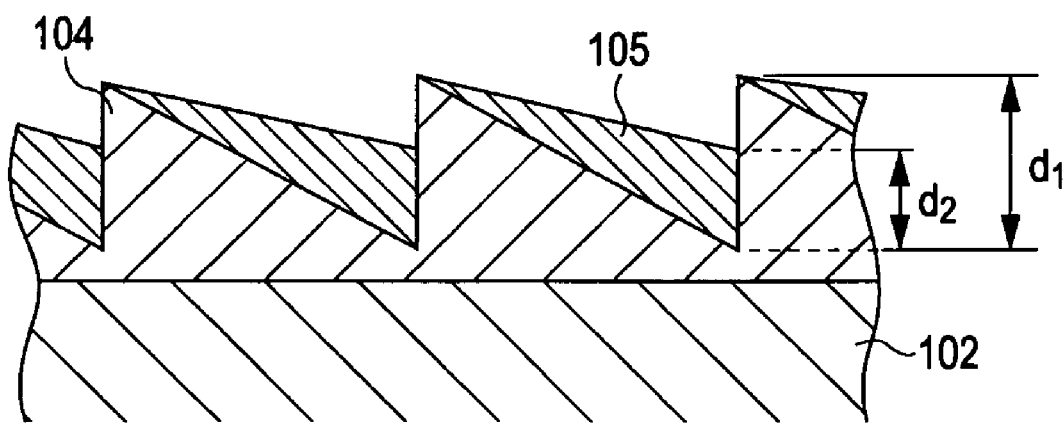
FIG. 14 illustrates another type of diffractive optical element.

FIGS. 13 and 14 illustrate diffractive optical elements.

Figure 15:
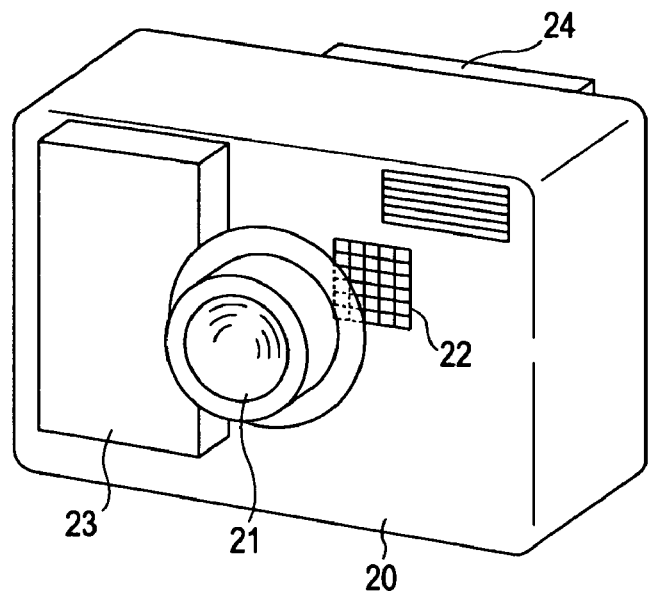
FIG. 15 schematically illustrates a digital camera.

FIG. 15 schematically illustrates a digital camera equipped with the zoom lens system according to at least one exemplary embodiment.

Figure 16:
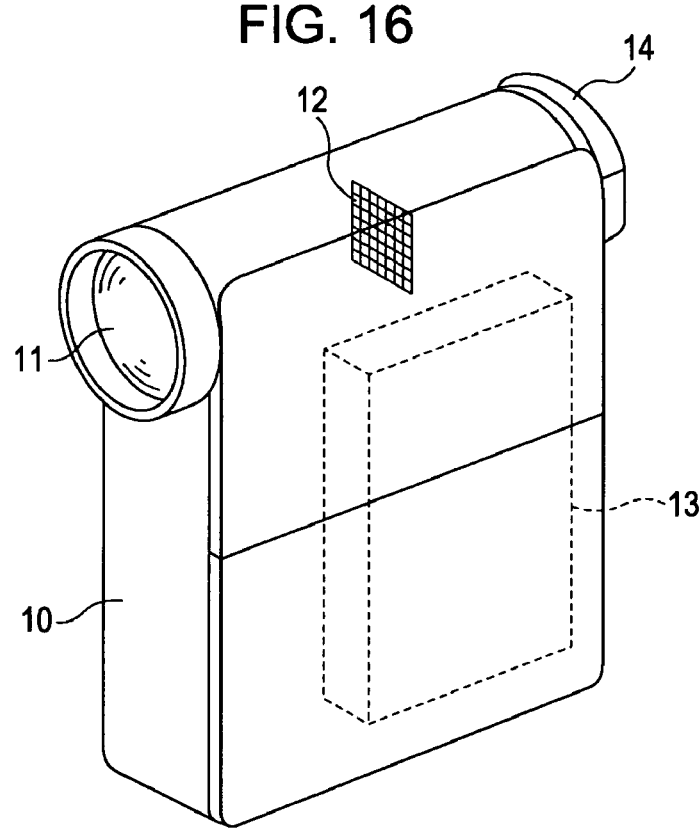
FIG. 16 schematically illustrates a video camera.

FIG. 16 schematically illustrates a video camera equipped with the zoom lens system according to at least one exemplary embodiment.

The zoom lens system according to each of the exemplary embodiments can be a photographic lens system used in an image pickup apparatus. In the cross-sectional views of FIGS. 1, 4, 7, and 10, the left side is the front side, which is a side closer to an object, whereas the right side is the rear side, which is a side where an image is formed.

The zoom lens system according each exemplary embodiment includes a first lens unit L1a-d, a second lens unit L2a-d, and a rear lens component Lra-d, that are arranged in that order from the object side towards the image side. Specifically, the first lens unit L1a-d can have a positive refractive power (i.e. refractive power=reciprocal of the focal length). The second lens unit L2 can have a negative refractive power and can move in the optical-axis direction for a zooming operation. The rear lens component Lra-d can include lens units having positive refractive power.

In the first to third exemplary embodiments shown in FIGS. 1, 4, and 7, the rear lens component Lra-c includes a third lens unit L3a-c having positive refractive power, a fourth lens unit L4a-c having negative refractive power, and a fifth lens unit L5a-c having positive refractive power.

In the fourth exemplary embodiment shown in FIG. 10, the rear lens component Lrd includes the third lens unit L3d having positive refractive power and the fourth lens unit L4d, which in this exemplary embodiment has positive refractive power.

In the cross-sectional views of FIGS. 1, 4, 7, and 10, reference character SP denotes an aperture stop. In each of the exemplary embodiments, the aperture stop SP is disposed between the second lens unit L2a-d and the third lens unit L3a-d.

Reference character G denotes an optical block, which can be, for example, an optical filter, a faceplate, a crystal lowpass filter, an infrared cut filter, or other filer system as known by one of ordinary skill in the relevant art and equivalents.

Reference character IP denotes an image plane. When the zoom lens system according to each exemplary embodiment is used as a photographic optical system in a video camera or a digital still camera, the image plane IP corresponds to an imaging surface of a solid-state image sensor (photoelectric transducer)(e.g., a CCD sensor and a CMOS sensor). On the other hand, if the zoom lens system according to each exemplary embodiment is used as a photographic optical system in a silver film camera, the image plane IP corresponds to a film surface.

The arrows shown with solid lines indicate the shifting paths of the lens units for a zooming operation from the wide-angle end to the telephoto end.

In each of the exemplary embodiments, the wide-angle end and the telephoto end correspond to opposite zoom positions between which the second lens unit L2a-d serving as a main variator lens unit can be movable in the optical-axis direction.

In the drawings showing the aberrations, reference characters d and g respectively denote d-line and g-line, and reference characters ΔM and ΔS respectively denote a meridional image plane and a sagittal image plane. Transverse chromatic aberration is indicated by the g-line. Reference character F denotes an F-number, and reference character ω denotes a half angle of view.

The common characteristics between the exemplary embodiments will be described first.

The first lens unit L1a-d is provided with a diffractive optical portion having at least one diffraction grating. If the Abbe number of a material of at least one positive lens element Lpa-d provided in the rear lens component Lra-d is represented as νp and the partial dispersion ratio of the material of the positive lens element Lpa-d is represented as θgF, the following conditional formula can be satisfied:

$$\nu p \cdot \theta gF > 38 \quad (1).$$

If the refractive indices of materials with respect to g-line, d-line, F-line, and C-line are respectively represented as Ng, Nd, NF, and NC, the Abbe number νd and the partial dispersion ratio θgF are expressed as follows.

Expression 1a:
$$\nu d = \frac{nd - 1}{NF - NC}$$

Expression 1b:
$$\theta_{gF} = \frac{Ng - NF}{NF - NC}$$

The diffractive optical portion in each exemplary embodiment is directed to a portion of a diffractive optical element that has a diffracting function. In detail, the diffractive optical portion is a portion of the diffractive optical element where at least one diffraction grating is provided on a substrate (a flat plate or a lens). Accordingly, the diffractive optical element is an element that has a diffractive optical portion having at least one diffraction grating disposed on a substrate (a flat plate or a lens).

In each exemplary embodiment, the positive lens element Lpa-d, which is formed of an extraordinary dispersion glass material and satisfies the conditional formula (1a), is provided in the rear lens component Lra-d, which is disposed closer to the image side than the diffractive optical portion included in the first lens unit L1a-d. In detail, although the diffractive optical portion facilitates the correction or error reduction for chromatic aberration at the telephoto end, it can be difficult to achieve both corrections for axial chromatic aberration and transverse chromatic aberration using a small number of lenses. For example, if the axial chromatic aberration at the telephoto end is corrected or error reduced with the diffractive optical portion of the first lens unit L1a-d, the transverse chromatic aberration for the short wavelength region and the long wavelength region at the wide-angle end and the telephoto end is generally over-corrected. Thus, even though the transverse chromatic aberration is favorably corrected at a zoom position requiring the correction, the transverse chromatic aberration can worsen at a zoom position where the transverse chromatic aberration is already over-corrected. In other words, even if the transverse chromatic aberration is properly corrected or the error reduced at a zoom position corresponding to one of the wide-angle end and the telephoto end, the transverse chromatic aberration becomes worse at the other zoom position than in a case where the diffractive optical portion is not present.

Therefore, in each exemplary embodiment, the positive lens element Lpa-d that satisfy the conditional formula (1a) is disposed in a lens unit that is closer to the image side than the aperture stop SP so that the transverse chromatic aberration is properly corrected or the error reduced.

In at least one exemplary embodiment, the positive lens element Lpa-d that satisfies the conditional formula (1a) is disposed in a lens unit that is most proximate to the image side and that has a large incident height for an off-axis light beam. This is more useful for correcting the chromatic aberration.

Furthermore, the numerical value of the conditional formula (1) can be set as follows:

$$\nu p \cdot \theta gF > 41 \quad (1c).$$

If the optical power of the diffractive optical portion in the first lens unit L1 is represented as φD, and the refractive power of the positive lens element Lpa-d is represented as φp, the following conditional formula can be satisfied:

$$1 \times 10^{-3} < \phi D/\phi p < 1 \times 10^{-2} \quad (2).$$

The optical power φD of the diffractive optical portion is determined in the following manner.

The phase pattern of the diffractive optical portion is expressed with the formula:

$$\phi(h) = (2\pi/\lambda d) \cdot (C2 \cdot h^2 + C4 \cdot h^4 + \cdots + C2 \cdot i \cdot h^{2 \cdot i}) \quad (2a),$$

where λd represents the reference wavelength (d-line); h represents the distance from the optical axis, and φ(h) represents the phase. In this case, the optical power φD is determined from the coefficient C2 of the second term in the following manner:

$$\phi D = -2 \cdot C2 \quad (2b).$$

The conditional formula (2) can set the range of the rate of the optical power φD of the diffractive optical portion to the refractive power φp of the positive lens element Lpa-d having extraordinary dispersion characteristics.

As described above, if the correction or error reduction for chromatic aberration by the diffractive optical portion and the correction or error reduction for chromatic aberration by the anomalous dispersion glass are well-balanced, the optical performance is favorably maintained over the entire zoom range. If the rate falls below the lower limit of the conditional formula (2), the diffractive optical portion lacks its correcting ability, thus resulting in insufficient correction for axial chromatic aberration at the telephoto end if the zoom lens system has a high zoom ratio. On the other hand, if the rate exceeds the upper limit of the conditional formula (2), the correction or error reduction for transverse chromatic aberration becomes insufficient especially at the wide-angle end.

More in at least one exemplary embodiment, the numerical range of the conditional formula (2) can be set as follows:

$$1.5 \times 10^{-3} < \phi D/\phi p < 8 \times 10^{-3} \tag{2c}$$

If the refractive power of the first lens unit L1 is represented as $\phi 1$, and the optical power of the diffractive optical portion is represented as $\phi D$, the following conditional formula can be satisfied:

$$9 \times 10^{-3} < \phi D/\phi 1 < 1.2 \times 10^{-2} \tag{3}$$

The conditional formula (3) can set the range of the rate of the optical power $\phi D$ of the diffractive optical portion to the refractive power $\phi 1$ of the first lens unit L1.

Generally, for correcting the chromatic aberration, the refractive power of the first lens unit L1 can be set at a low value.

Since the incorporation of the diffractive optical portion in the first lens unit L1 increases the refractive power of the first lens unit L1, the entire zoom lens system is readily reduced in size. If the rate falls below the lower limit of the conditional formula (3), the correcting ability for chromatic aberration can be insufficient since the optical power of the diffractive optical portion is too low. On the other hand, if the rate exceeds the upper limit of the conditional formula (3), the refractive power of the first lens unit L1 is too low. This can be less useful since the optical system will be increased in size for achieving high zooming function.

In at least one exemplary embodiment, the numerical range of the conditional formula (3) can be set as follows:

$$9.3 \times 10^{-3} < \phi D/\phi 1 < 1.15 \times 10^{-2} \tag{3a}$$

If the refractive power of the first lens unit L1 is represented as $\phi 1$, and the focal length at the telephoto end of the entire system is represented as fT, the following conditional formula can be satisfied:

$$0.5 < \phi 1 \cdot fT < 2.0 \tag{4}$$

The conditional formula (4) can set the range of the product of the refractive power $\phi 1$ of the first lens unit L1 and the focal length fT at the telephoto end. If the product falls below the lower limit of the conditional formula (4), the refractive power of the first lens unit L1 is insufficient. For this reason, it can be difficult to attain a sufficient optical power of the diffractive optical portion, thus leading to under-corrected chromatic aberration. On the other hand, if the product exceeds the upper limit of the conditional formula (4), the focal length at the telephoto end is increased if the zoom lens system has a high zoom ratio, causing the refractive power of the first lens unit L1 to become excessively high. Thus, the chromatic aberration is over-corrected by the diffractive optical portion, meaning that the correction or error reduction for chromatic aberration using the additionally provided positive lens element of extraordinary dispersion glass becomes difficult.

More in at least one exemplary embodiment, the numerical range of the conditional formula (4) can be set as follows:

$$0.7 < \phi 1 \cdot fT < 1.8 \tag{4a}$$

As in the first to third exemplary embodiments, if the rear lens component Lra-d has the third lens unit L3 of positive refractive power, the fourth lens unit L4 of negative refractive power, and the fifth lens unit L5 of positive refractive power that are arranged in that order from the object side towards the image side, the following conditional formula can be satisfied:

$$0.9 < \phi p/\phi 5 < 2.2 \tag{5}$$

In this case, $\phi p$ represents the refractive power of the positive lens element Lp, and $\phi 5$ represents the refractive power of the fifth lens unit L5.

The conditional formula (5) can set the range of the rate of the refractive power $\phi p$ of the extraordinary-dispersion positive lens element Lpa-d satisfying the conditional formula (1) to the refractive power $\phi 5$ of the fifth lens unit L5. If the rate falls below the lower limit of the conditional formula (5), the correction or error reduction for transverse chromatic aberration is especially difficult since the extraordinary dispersion positive lens element Lpa-d lacks its correcting ability for chromatic aberration. On the other hand, if the rate exceeds the upper limit of the conditional formula (5), the refractive power of the fifth lens unit L5 becomes too low, thus causing insufficient corrections for other aberrations, such as coma aberration and astigmatism.

In at least one exemplary embodiment, the numerical range of the conditional formula (5) can be set as follows:

$$1.1 < \phi p/\phi 5 < 2.0 \tag{5a}$$

In this case, the diffractive optical portion has a multilayer structure that includes a plurality of diffraction gratings composed of materials having different dispersion characteristics.

Accordingly, this can achieve a high diffraction efficiency over the entire range of visible light.

The features of the above-referenced exemplary embodiments will now be described.

First Exemplary Embodiment

In the first exemplary embodiment shown in FIG. 1, when a zooming operation from the wide-angle end to the telephoto end is performed, the first lens unit L1a is moved A1 towards the object side and the second lens unit L2a is moved B1 towards the image side, as indicated by the arrows, so as to change the magnifying power. The third lens unit L3a is moved C1 along a convex-shaped path towards the object side together with the aperture stop SP disposed adjacent to the third lens unit L3a on the object side. The fourth lens unit L4a and the fifth lens unit L5a are moved 5a-b along nonlinear paths so as to compensate for a displacement of the image plane position in response to the changed magnifying power.

A solid curve line 5a and a dotted curve line 5b respectively indicate moving paths of the fifth lens unit L5a for compensating for a displacement of the image plane position in response to the zooming operation from the wide-angle end to the telephoto end when an object at an infinite distance is being focused and an object at a close distance is being focused. Accordingly, by allowing the movement of the fifth lens unit L5a along a convex-shaped path towards the object side, the space between the fourth lens unit L4a and the fifth lens unit L5a can be utilized efficiently, thereby contributing to a reduced overall length of the zoom lens system.

In the first exemplary embodiment, for example, when performing a focusing operation from an infinite-distance object to a close-distance object at the telephoto end, the fifth lens unit L5a is moved forward, as indicated by an arrow 5c.

Moreover, in the first exemplary embodiment, substantial portions of the lens units are moved along the optical axis when a zooming operation is performed. In particular, when a zooming operation from the wide-angle end to the telephoto end is performed, the first lens unit L1a is moved A1 monotonously towards the object side, and the third lens unit L3a is moved C1 along the convex-shaped path towards the object side. This contributes to a reduced effective diameter of the first lens unit L1a. Although the fifth lens unit L5a serves as a focusing-lens unit in the first exemplary embodiment, the focusing operation can alternatively be performed by the fourth lens unit L4a instead of the fifth lens unit L5a. Furthermore, the third lens unit L3a can be moved in a manner such that it has a component extending perpendicular to the optical axis. This reduces blurring of captured images caused by hand movement.

In the first exemplary embodiment, the first lens unit L1a includes a compound lens comprising a meniscus negative lens element G1a whose object side is convex and a positive lens element G2a, and also includes a meniscus positive lens element G3a whose object side is convex. The negative lens element G1a, positive lens element G2a, and positive lens element G3a are arranged in that order from the object side towards the image side. The diffraction optical portion is provided between the attached surfaces of the negative lens element G1a and the positive lens element G2a. Specifically, the diffractive optical portion includes at least one diffraction grating that is rotationally symmetrical with respect to the optical axis. Accordingly, the compound lens, which can have the diffractive optical portion, defines the diffractive optical element. By properly setting the curvature of the attached surfaces provided with the diffractive optical portion, the angle of light incident on the diffractive optical portion based on each angle of view can be controlled, thereby maintaining a high diffraction efficiency over the entire zoom range and for a full angle of view.

Furthermore, in the first exemplary embodiment, the positive lens element Lpa having extraordinary dispersion characteristics is disposed in the fifth lens unit L5a. Since the correction or error reduction for axial chromatic aberration and the correction or error reduction for transverse chromatic aberration are achieved cooperatively with the diffractive optical element disposed in the first lens unit L1a and the extraordinary-dispersion positive lens element Lpa disposed in the fifth lens unit L5a, a favorable aberration correction is readily achieved over the entire zoom range.

The configuration of the diffractive optical element used in the first exemplary embodiment and in the exemplary embodiments to be described later will now be described.

FIG. 13 is a cross-sectional view showing an enlarged section of a diffractive optical element 1. FIG. 13 illustrates an example in which a single-layer diffraction grating 3 is disposed on a substrate (transparent substrate to a design wavelength) 2. An optical material of the diffraction grating 3 is, for example, ultraviolet curing resin (e.g., refractive index nd=1.513; Abbe number vd=51.0). The grating thickness d1 is set at an appropriate amount in accordance with the design phase so that the diffraction efficiency of a positive first order diffraction ray is at maximum at a chosen wavelength, for example, a wavelength of 530 nm. In other words, the design order is positive first order, and the design wavelength is 530 nm. Generally, the diffraction efficiency at the design order reaches its maximum near the design wavelength and gradually decreases at other wavelengths.

The decreased amount of the diffraction efficiency at the design order corresponds to diffraction rays of other orders, which is the cause of flare. On the other hand, if a plurality of diffractive optical elements is used in various positions of an optical system, a decrease in the diffraction efficiency at wavelengths other than the design wavelength can also lead to a decrease in transmittance.

A layered diffractive optical element, which can have a layered structure of a plurality of diffraction gratings composed of different materials on a substrate, will now be described. FIG. 14 is a cross-sectional view showing an enlarged section of a layered diffractive optical element. The diffractive optical element shown in FIG. 14 includes a first diffraction grating 104 disposed on a substrate 102 and composed of ultraviolet curing resin (e.g., refractive index nd=1.499; Abbe number vd=54); and a second diffraction grating 105 (e.g., refractive index nd=1.598; Abbe number vd=28) disposed on the first diffraction grating 104. With respect to the combination of these materials, the grating thickness d1 of the first diffraction grating 104 and the grating thickness d2 of the second diffraction grating 105 can be determined from the design phase.

In the layered diffractive optical element, the materials of the diffraction gratings are not limited to ultraviolet curing resin, and can be other materials. Moreover, depending on the substrate, the first layer can be formed directly in the substrate. Furthermore, the grating thicknesses do not necessary have to be different. For example, depending on the combination of the materials, the two diffraction gratings 104 and 105 can have the same grating thickness. In that case, since the top surface will not have grating topography, the diffractive optical element will be highly dust resistant, and moreover, the assembly process of the diffractive optical element will be improved. Furthermore, the two diffraction gratings 104 and 105 do not necessarily have to be tightly attached to each other. For example, the two diffraction gratings 104 and 105 can have an air space therebetween.

In the first exemplary embodiment, the substrate 2 shown in FIG. 13 or the substrate 102 shown in FIG. 14 defines at least one of the lenses of the compound lens, and the diffraction grating 3 (or diffraction gratings 104, 105) is disposed on a lens surface of that lens. For example, if the single-layer diffraction grating 3 shown in FIG. 13 is used, the diffraction grating 3 can be provided on a lens surface of one of the lenses. On the other hand, in a case where a plurality of diffraction gratings is used to form two or more layers, the diffraction gratings can be provided on lens surfaces of both lenses included in the compound lens. In that case, the lens surfaces can be bonded to each other along the peripheral portions thereof (that is, portions outside the effective diameter) while properly positioning the gratings. In the first exemplary embodiment, although the attached surfaces provided with the diffractive optical portion are spherical, these attached surfaces can alternatively be flat. Moreover, the base surface on which the diffraction grating (or the diffraction gratings) is disposed can be made aspherical so that spherical aberration and coma aberration at the telephoto end can be readily corrected.

The configuration of the diffractive optical portion described above is the same for each of the remaining exemplary embodiments which will be described below.

As described above, since the diffractive optical portion includes at least one single-layer phase-type diffraction grating, the diffractive optical portion actually has a predetermined thickness. However, since such a thickness can be disregarded from a geometrical optics viewpoint, the diffractive optical portion is also known as a diffractive optical surface (diffractive surface).

Second Exemplary Embodiment

In the second exemplary embodiment shown in FIG. 4, when a zooming operation from the wide-angle end to the telephoto end is performed, the second lens unit L2b is moved B2 towards the image side, as indicated by an arrow, so as to change the magnifying power. Moreover, the fourth lens unit L4b is moved D2 along a convex-shaped path towards the image side, and contemporaneously, the fifth lens unit L5b is moved 5a-b along a convex-shaped path towards the object side. Accordingly, this compensates for a displacement of the image plane position in response to the changed magnifying power.

By allowing movement of the fifth lens unit L5b along the convex-shaped path towards the object side for the zooming operation, the space between the fourth lens unit L4b and the fifth lens unit L5b can be utilized efficiently, thereby contributing to a reduced overall length of the zoom lens system.

The technical definitions of curve lines 5a, 5b and a straight line 5c related with the movement of the fifth lens unit L5 are the same as in the first exemplary embodiment.

In the second exemplary embodiment, a focusing operation from an infinite-distance object to a close-distance object is performed by moving the fifth lens unit L5b forward. Alternatively, the fourth lens unit L4b can be moved backwards instead of moving the fifth lens unit L5b forward.

According to the second exemplary embodiment, the first lens unit L1b and the third lens unit L3b are not moved for the zooming operation and the focusing operation. Where necessary, these lens units can be moved as in the first exemplary embodiment. Furthermore, the third lens unit L3b can be moved in a manner such that it has a component extending perpendicular to the optical axis, thereby preventing or reducing blurring of captured images caused by hand movement.

In the second exemplary embodiment, the configurations of the first lens unit L1b and the fifth lens unit L5b are the same as those in the first exemplary embodiment.

Third Exemplary Embodiment

In the third exemplary embodiment shown in FIG. 7, when a zooming operation from the wide-angle end to the telephoto end is performed, the second lens unit L2c is moved B3 towards the image side, as indicated by an arrow, so as to change the magnifying power. The fourth lens unit L4c is moved D3 along a nonlinear path, and the fifth lens unit L5c is moved 5a-b along a convex-shaped path towards the object side so as to compensate for a displacement of the image plane position in response to the changed magnifying power.

Furthermore, a rear focusing operation is also performed by moving the fifth lens unit L5c in the optical-axis direction. The technical definitions of curve lines 5a, 5b and a straight line 5c related with the movement of the fifth lens unit L5c are the same as in the first exemplary embodiment.

Although the first lens unit L1c and the third lens unit L3c are not moved for the zooming operation in the third exemplary embodiment, these lens units can be moved where necessary.

Furthermore, in the third exemplary embodiment, the third lens unit L3c can be moved in a manner such that it has a component extending perpendicular to the optical axis, thereby preventing blurring of captured images caused by hand movement. In comparison to the first and second exemplary embodiments, the third lens unit L3c and the fifth lens unit L5c in the third exemplary embodiment have a smaller number of lenses so that the optical performance during the moving of the third lens unit L3c for blur prevention or reduction is properly maintained.

According to the third exemplary embodiment, three lens units are moved for the zooming operation so as to achieve favorable optical performance over the entire zoom range.

The configuration of the first lens unit L1c according to the third exemplary embodiment is the same as that in the first exemplary embodiment.

Furthermore, in the third exemplary embodiment, the positive lens element Lpc having anomalous dispersion characteristics is disposed in the fifth lens unit L5c so that the axial chromatic aberration and the transverse chromatic aberration are corrected or error reduced in a well-balanced manner.

Fourth Exemplary Embodiment

In the fourth exemplary embodiment shown in FIG. 10, when a zooming operation from the wide-angle end to the telephoto end is performed, the second lens unit L2d is moved B4 towards the image side, as indicated by an arrow, and the fourth lens unit L4d is moved 4a-b along a convex-shaped path towards the object side.

Furthermore, a rear focusing operation is also performed by moving the fourth lens unit L4d in the optical-axis direction. A solid curve line 4a and a dotted curve line 4b respectively indicate moving paths of the fourth lens unit L4d for compensating for a displacement of the image plane position caused when an object at an infinite distance is being focused and an object at a close distance is being focused. By allowing the movement of the fourth lens unit L4d along the convex-shaped path towards the object side, the space between the third lens unit L3d and the fourth lens unit L4d can be utilized efficiently, thereby contributing to a reduced overall length of the zoom lens system.

Furthermore, for performing a focusing operation from an infinite-distance object to a close-distance object at the telephoto end, the fourth lens unit L4d is moved forward, as indicated by an arrow 4c.

Although the first lens unit L1d and the third lens unit L3d are not moved for the zooming operation in the fourth exemplary embodiment, these lens units can be moved where necessary.

Furthermore, the third lens unit L3d can be moved in a manner such that it has a component extending perpendicular to the optical axis, thereby preventing or reduce blurring of captured images caused by hand movement.

According to the fourth exemplary embodiment, the overall length of the optical system is reduced in accordance with a reduced number of lenses, and moreover, favorable optical performance is achieved over the entire zoom range.

The configuration of the first lens unit L1d according to the fourth exemplary embodiment is the same as that in the first exemplary embodiment.

Specifically, the first lens unit L1d in the fourth exemplary embodiment is provided with the diffractive optical portion between the attached surfaces of the negative lens element G1d and the positive lens element G2d. The diffractive optical portion has at least one diffraction grating that is rotationally symmetrical with respect to the optical axis.

Furthermore, in the fourth exemplary embodiment, the positive lens element Lpd having extraordinary dispersion characteristics is disposed in the fourth lens unit L4d so that the axial chromatic aberration is corrected or error reduced in a well-balanced manner.

According to the zoom lens system of each of the above exemplary embodiments, the diffractive optical portion is provided between the attached surfaces of the compound lens in the first lens unit L1a-d, such that the diffractive optical portion sets an appropriate phase for a permeable surface. Consequently, the chromatic aberration generated in the first lens unit L1a-d is reduced and properly corrected or the error reduced over the entire zoom range.

For example, if the first lens unit L1a-d has only a positive lens element, and the diffractive optical portion is provided in the first lens unit L1a-d, the chromatic aberration can still be reduced for two wavelengths, such as the d-line and g-line. However, since the diffractive optical portion has high extraordinary dispersion characteristics, the chromatic aberration at other wavelengths becomes greater especially at the telephoto end. In other words, the secondary spectrum becomes greater. This implies that the chromatic aberration cannot be corrected over the entire visible wavelength range.

Therefore, in at least one exemplary embodiment, an achromatic condition of the diffractive system and an achromatic condition of the diffractive optical portion are optimally combined so that the chromatic aberration is properly corrected or the error reduced over the entire visible range including the secondary spectrum especially at the telephoto end. Accordingly, high optical performance is achieved.

In the zoom lens system according to at least one exemplary embodiment, in order to allow the diffractive optical portion to cooperatively perform the role of the achromatic effect of the first lens unit L1a-d, the optical power of the diffractive optical portion can be set at a positive value. In contrast, if the optical power of the diffractive optical portion has a negative value, the direction of chromatic aberration becomes the same as that of chromatic aberration generated in a common refractive optical system. This means that an achromatic effect by the diffractive optical portion is not attained, and therefore, the chromatic aberration cannot be corrected over the entire range of the optical system.

Furthermore, in a zoom lens system, which can have a high zoom ratio of 10× or more, the angle of light incident on the first lens unit L1a-d can change significantly in accordance with the zoom position or the angle of view. When the incident angle on the diffractive optical portion changes, the diffraction efficiency is lowered, which is the cause of color flare. Therefore, in the zoom lens system according to each of the first to fourth exemplary embodiments, the lens surfaces provided with the diffractive optical portion can be set at an appropriate position and be given an appropriate radius of curvature, and each lens unit can be properly set so that a high diffraction efficiency is attained over the entire zoom range and for a full angle of view.

Furthermore, the diffractive optical portion can be sectioned into multiple areas such that an assumed incident angle on the diffractive optical portion is different between the central area and peripheral areas of the diffractive optical portion. In that case, the grating structure is optimized according to each area. This further prevents the lowering of diffraction efficiency caused by a change in the incident angle on the diffractive optical portion. In particular, in the zoom lens system according to each of the first to fourth exemplary embodiments, the grating thickness in the peripheral areas can be set smaller than that in the central area.

As described above, the zoom lens system according to at least one exemplary embodiment basically includes the first lens unit L1a-d having positive refractive power, the second lens unit L2a-d having negative refractive power and moving in the optical axis direction for a zooming operation, and the rear lens component Lra-d having positive refractive power and disposed adjacent to the second lens unit L2a-d on the image side. The first lens unit L1a-d, the second lens unit L2a-d, and the rear lens component Lra-d are disposed in that order from the object side towards the image side.

According to this basic configuration, the chromatic aberration is properly corrected or the error reduced, whereby high optical performance is achieved or improved.

First to fourth numerical examples respectively corresponding to the first to fourth exemplary embodiments will be shown below. In each numerical example, i designates the number of a lens surface in the arranged order of lens surfaces from the object side to the image side; ri designates the radius of curvature of an i-th surface from the object side; di designates the distance between an i-th surface and an (i+1)th surface from the object side; ni and vi respectively designate the refractive index and the Abbe number of an optical material of an i-th surface based on d-line; and f, F, 2ω respectively designate the focal length, the F number, and the angle of view of the entire system when focused on an object at an infinite distance.

Two surfaces that are most proximate to the image side are surfaces included in the optical block G.

An aspherical structure is expressed as follows:

$$X=(1/R)H^2/(1+(1-(1+k)(H/R)^2)^{1/2})+BH^4+CH^6+DH^8. \qquad (6)$$

In this case, X represents an X-axis extending in the optical-axis direction; H represents an H-axis extending perpendicular to the optical axis; the traveling direction of light is positive; R represents a paraxial radius of curvature; k represents a conic constant; and B, C, and D represent coefficients of an aspherical structure.

The diffractive optical surface (diffractive surface) is expressed by giving phase coefficients of the above-mentioned phase function:

$$\phi(h)=(2\pi/\lambda d)\cdot(C2\cdot h^2+C4\cdot h^4+\cdots+C2\cdot i\cdot h^{2\cdot i}). \qquad (7)$$

In this case, for example, "E-Z" indicates "$10^{-z}$." Table 1 illustrates the relationship between the above-referenced conditional formulas and numerical values in the first to fourth numerical examples respectively corresponding to the first to fourth exemplary embodiments.

Expression 3:
First Numerical Example
f = 7.4–84.2 F/2.5–3.6 2ω = 73.2°–7.5°

| | | | |
|---|---|---|---|
| r1 = 117.014 | d1 = 3.30 | n1 = 1.84666 | ν1 = 23.9 |
| r2 = 67.954 | d2 = 10.05 | n2 = 1.58313 | ν2 = 59.4 |
| r3 = 88605.750 | d3 = 0.20 | | |
| r4 = 60.430 | d4 = 5.60 | n3 = 1.69680 | ν3 = 55.5 |
| r5 = 142.262 | d5 = VARIABLE | | |
| r6 = 77.329 | d6 = 1.50 | n4 = 1.83481 | ν4 = 42.7 |
| r7 = 12.497 | d7 = 7.80 | | |
| r8 = −71.361 | d8 = 1.10 | n5 = 1.77250 | ν5 = 49.6 |
| r9 = 36.361 | d9 = 0.70 | | |
| r10 = 22.203 | d10 = 4.40 | n6 = 1.84666 | ν6 = 23.9 |
| r11 = −112.205 | d11 = 1.10 | n7 = 1.83481 | ν7 = 42.7 |
| r12 = 52.863 | d12 = VARIABLE | | |
| r13 = STOP | d13 = 2.85 | | |
| r14 = 57.241 | d14 = 2.60 | n8 = 1.69680 | ν8 = 55.5 |
| r15 = −34.175 | d15 = 0.50 | | |
| r16 = 51.161 | d16 = 3.40 | n9 = 1.60311 | ν9 = 60.6 |
| r17 = −17.579 | d17 = 0.80 | n10 = 1.84666 | ν10 = 23.9 |
| r18 = −55.240 | d18 = VARIABLE | | |
| r19 = −17.833 | d19 = 2.50 | n11 = 1.68893 | ν11 = 31.1 |
| r20 = −11.454 | d20 = 1.00 | n12 = 1.51633 | ν12 = 64.1 |
| r21 = 76.358 | d21 = VARIABLE | | |
| r22 = 19.185 | d22 = 4.00 | n13 = 1.69680 | ν13 = 55.5 |
| r23 = −40.169 | d23 = 0.20 | | |
| r24 = 17.351 | d24 = 4.60 | n14 = 1.49700 | ν14 = 81.5 |
| r25 = −18.487 | d25 = 0.80 | n15 = 1.80610 | ν15 = 33.3 |
| r26 = 14.733 | d26 = 1.30 | | |
| r27 = 178.936 | d27 = 2.40 | n16 = 1.58313 | ν16 = 59.4 |
| r28 = −46.409 | d28 = 3.70 | | |
| r29 = ∞ | d29 = 3.50 | n17 = 1.51633 | ν17 = 64.2 |
| r30 = ∞ | | | |

| | FOCAL LENGTH | | |
|---|---|---|---|
| VARIABLE DISTANCE | 7.40 | 24.97 | 84.17 |
| d5 | 1.00 | 34.84 | 61.86 |
| d12 | 38.56 | 14.15 | 1.80 |
| d18 | 1.59 | 9.55 | 12.04 |
| d21 | 12.00 | 9.09 | 5.54 |

ASPHERICAL SURFACE

| | | | | |
|---|---|---|---|---|
| (19TH SURFACE) | k = 8.99200E−1 | B = 2.62797E−5 | C = 3.09437E−7 | D = −5.07043E−9 |
| (28TH SURFACE) | k = −42.9980 | B = 6.28356E−5 | C = 1.39198E−6 | D = −1.14535E−8 |

DIFFRACTIVE OPTICAL SURFACE

| | | |
|---|---|---|
| (2ND SURFACE) | C2 = −5.33758E−5 | C4 = 7.48487E−9 |

Expression 4:
Second Numerical Example
f = 9.2–100.0 F/2.8–3.6 2ω = 62.0°–6.3°

| | | | |
|---|---|---|---|
| r1 = 97.425 | d1 = 2.20 | n1 = 1.84666 | ν1 = 23.8 |
| r2 = 51.790 | d2 = 7.70 | n2 = 1.58313 | ν2 = 59.4 |
| r3 = −337.801 | d3 = 0.20 | | |
| r4 = 39.622 | d4 = 4.50 | n3 = 1.69680 | ν3 = 55.5 |
| r5 = 93.620 | d5 = VARIABLE | | |
| r6 = 84.813 | d6 = 1.30 | n4 = 1.83481 | ν4 = 42.7 |
| r7 = 11.452 | d7 = 6.40 | | |
| r8 = −47.912 | d8 = 1.00 | n5 = 1.69680 | ν5 = 55.5 |
| r9 = 83.540 | d9 = 0.68 | | |
| r10 = 19.644 | d10 = 4.20 | n6 = 1.84666 | ν6 = 23.8 |
| r11 = −240.877 | d11 = 0.95 | n7 = 1.83481 | ν7 = 42.7 |
| r12 = 29.620 | d12 = VARIABLE | | |
| r13 = STOP | d13 = 2.86 | | |
| r14 = 65.082 | d14 = 2.60 | n8 = 1.69680 | ν8 = 55.5 |
| r15 = −74.312 | d15 = 0.50 | | |
| r16 = 102.862 | d16 = 3.40 | n9 = 1.60311 | ν9 = 60.6 |
| r17 = −20.549 | d17 = 0.75 | n10 = 1.84666 | ν10 = 23.8 |
| r18 = −41.507 | d18 = VARIABLE | | |

-continued

Expression 4:
Second Numerical Example
f = 9.2–100.0 F/2.8–3.6 2ω = 62.0°–6.3°

| | | | |
|---|---|---|---|
| r19 = −27.312 | d19 = 2.50 | n11 = 1.68893 | ν11 = 31.1 |
| r20 = −18.177 | d20 = 0.90 | n12 = 1.51633 | ν12 = 64.1 |
| r21 = 137.391 | d21 = VARIABLE | | |
| r22 = 21.569 | d22 = 4.20 | n13 = 1.69680 | ν13 = 55.5 |
| r23 = −45.146 | d23 = 0.20 | | |
| r24 = 24.087 | d24 = 4.20 | n14 = 1.49700 | ν14 = 81.5 |
| r25 = −20.564 | d25 = 0.80 | n15 = 1.80610 | ν15 = 33.3 |
| r26 = 24.009 | d26 = 1.20 | | |
| r27 = −100.664 | d27 = 2.10 | n16 = 1.58313 | ν16 = 59.4 |
| r28 = −41.983 | d28 = 5.00 | | |
| r29 = ∞ | d29 = 3.50 | n17 = 1.51633 | ν17 = 64.2 |
| r30 = ∞ | | | |

| | FOCAL LENGTH | | |
|---|---|---|---|
| VARIABLE DISTANCE | 9.15 | 30.30 | 100.07 |
| d5 | 1.00 | 23.24 | 38.00 |
| d12 | 38.86 | 16.62 | 1.86 |
| d18 | 3.57 | 9.60 | 13.20 |
| d21 | 16.49 | 7.14 | 10.93 |

ASPHERICAL SURFACE

| | | | | |
|---|---|---|---|---|
| (19TH SURFACE) | k = −2.92775 | B = −1.87712E−5 | C = −1.54444E−8 | D = 2.72154E−10 |
| (28TH SURFACE) | k = −14.7336 | B = 1.93355E−5 | C = 6.38056E−8 | D = −5.57371E−10 |

DIFFRACTIVE OPTICAL SURFACE

| (2ND SURFACE) | C2 = −7.76394E−5 | C4 = 2.14038E−8 |
|---|---|---|

Expression 5:
Third Numerical Example
f = 9.2–80.0 F/2.8–3.6 2ω = 62.0°–7.9°

| | | | |
|---|---|---|---|
| r1 = 115.646 | d1 = 2.20 | n1 = 1.84666 | ν1 = 23.8 |
| r2 = 59.742 | d2 = 7.80 | n2 = 1.58313 | ν2 = 59.4 |
| r3 = −248.933 | d3 = 0.20 | | |
| r4 = 41.203 | d4 = 4.50 | n3 = 1.69680 | ν3 = 55.5 |
| r5 = 85.467 | d5 = VARIABLE | | |
| r6 = 71.824 | d6 = 1.30 | n4 = 1.83481 | ν4 = 42.7 |
| r7 = 12.220 | d7 = 7.40 | | |
| r8 = −35.861 | d8 = 1.00 | n5 = 1.69680 | ν5 = 55.5 |
| r9 = 119.468 | d9 = 0.68 | | |
| r10 = 27.704 | d10 = 4.20 | n6 = 1.84666 | ν6 = 23.8 |
| r11 = −112.122 | d11 = 0.95 | n7 = 1.83481 | ν7 = 42.7 |
| r12 = 81.449 | d12 = VARIABLE | | |
| r13 = STOP | d13 = 2.86 | | |
| r14 = 33.122 | d14 = 4.00 | n8 = 1.69680 | ν8 = 55.5 |
| r15 = −18.085 | d15 = 0.75 | n9 = 1.84666 | ν9 = 23.8 |
| r16 = −42.262 | d16 = VARIABLE | | |
| r17 = −54.422 | d17 = 2.20 | n10 = 1.68893 | ν10 = 31.1 |
| r18 = −20.627 | d18 = 0.90 | n11 = 1.51633 | ν11 = 64.1 |
| r19 = 61.442 | d19 = VARIABLE | | |
| r20 = 18.551 | d20 = 4.00 | n12 = 1.69680 | ν12 = 55.5 |
| r21 = −27.787 | d21 = 0.20 | | |
| r22 = 22.967 | d22 = 4.00 | n13 = 1.49700 | ν13 = 81.5 |
| r23 = −15.154 | d23 = 0.80 | n14 = 1.80610 | ν14 = 33.3 |
| r24 = 14.939 | d24 = 3.00 | | |
| r25 = ∞ | d25 = 3.50 | n15 = 1.51633 | ν15 = 64.2 |
| r26 = ∞ | | | |

| | FOCAL LENGTH | | |
|---|---|---|---|
| VARIABLE DISTANCE | 9.15 | 27.04 | 79.99 |
| d5 | 1.00 | 24.83 | 42.02 |
| d12 | 42.88 | 19.05 | 1.86 |
| d16 | 5.01 | 7.22 | 3.06 |
| d19 | 9.72 | 4.60 | 12.95 |

-continued

Expression 5:
Third Numerical Example
f = 9.2–80.0 F/2.8–3.6 2ω = 62.0°–7.9°

ASPHERICAL SURFACE (14TH SURFACE)  k = 2.61606E−1  B = −1.48069E−5  C = 1.48880E−7  D = −4.37835E−9
(20TH SURFACE)  k = −2.22282    B = 1.49499E−5   C = −2.31194E−8 D = −3.35305E−10

DIFFRACTIVE OPTICAL SURFACE (2ND SURFACE)  C2 = 8.05918E−5   C4 = 3.14820E−8

Expression 6:
Fourth Numerical Example
f = 7.7–76.0 F/2.8–4.0 2ω = 71.1°–8.3°

| | | | |
|---|---|---|---|
| r1 = 64.596    | d1 = 2.00       | n1 = 1.84666  | ν1 = 23.9 |
| r2 = 39.414    | d2 = 7.10       | n2 = 1.60311  | ν2 = 60.7 |
| r3 = 2248.791  | d3 = 0.20       |               |           |
| r4 = 37.531    | d4 = 4.20       | n3 = 1.69680  | ν3 = 55.5 |
| r5 = 100.107   | d5 = VARIABLE   |               |           |
| r6 = 54.492    | d6 = 1.00       | n4 = 1.83400  | ν4 = 37.2 |
| r7 = 8.639     | d7 = 5.00       |               |           |
| r8 = −24.999   | d8 = 0.90       | n5 = 1.74400  | ν5 = 44.8 |
| r9 = 398.607   | d9 = 0.45       |               |           |
| r10 = 16.137   | d10 = 3.30      | n6 = 1.84666  | ν6 = 23.9 |
| r11 = −63.799  | d11 = 0.70      | n7 = 1.66672  | ν7 = 48.3 |
| r12 = 20.892   | d12 = VARIABLE  |               |           |
| r13 = STOP     | d13 = 2.70      |               |           |
| r14 = 14.535   | d14 = 2.80      | n8 = 1.58313  | ν8 = 59.4 |
| r15 = 52.821   | d15 = 3.48      |               |           |
| r16 = 43.730   | d16 = 0.75      | n9 = 1.76182  | ν9 = 26.5 |
| r17 = 17.234   | d17 = 0.58      |               |           |
| r18 = 39.522   | d18 = 2.40      | n10 = 1.51633 | ν10 = 64.1 |
| r19 = −24.141  | d19 = VARIABLE  |               |           |
| r20 = 15.727   | d20 = 2.60      | n11 = 1.77250 | ν11 = 49.6 |
| r21 = 726.830  | d21 = 0.60      | n12 = 1.84666 | ν12 = 23.8 |
| r22 = 24.662   | d22 = 2.00      |               |           |
| r23 = 135.404  | d23 = 2.80      | n13 = 1.49700 | ν13 = 81.5 |
| r24 = −45.268  | d24 = VARIABLE  |               |           |
| r25 = ∞        | d25 = 3.10      | n14 = 1.51633 | ν14 = 64.1 |
| r26 = ∞        |                 |               |           |

| | FOCAL LENGTH | | |
|---|---|---|---|
| VARIABLE DISTANCE | 7.70 | 24.19 | 76.05 |
| d5  | 0.90  | 20.86 | 32.34 |
| d12 | 33.30 | 13.33 | 1.86  |
| d19 | 14.47 | 9.04  | 13.39 |
| d24 | 5.00  | 10.44 | 6.08  |

ASPHERICAL SURFACE (14TH SURFACE)  k = −5.61521  B = 1.87360E−4   C = −1.86775E−6  D = 1.4822E−8
(24TH SURFACE)  k = −63.5658  B = −3.19215E−5  C = 8.78270E−7   D = −6.60232E−9

DIFFRACTIVE OPTICAL SURFACE (2ND SURFACE)  C2 = −9.44391E−5   C4 = 1.02953E−8

TABLE 1

| CONDITIONAL FORMULA | | FIRST EMBODIMENT | SECOND EMBODIMENT | THIRD EMBODIMENT | FOURTH EMBODIMENT |
|---|---|---|---|---|---|
| 1 | $\nu_p \cdot \theta_{gF}$ | 43.9   | 43.9   | 43.9   | 43.9   |
| 2 | $\phi_D/\phi_p$           | 2.0E−03 | 3.6E−03 | 2.7E−03 | 5.5E−03 |
| 3 | $\phi_D/\phi_1$           | 1.1E−02 | 9.8E−03 | 1.1E−02 | 9.5E−03 |
| 4 | $\phi_1 \cdot f_T$        | 0.85   | 1.58   | 1.15   | 1.49   |
| 5 | $\phi_p/\phi_5$           | 1.30   | 1.22   | 1.98   | —      |

Each of the above exemplary embodiment achieves a high performance, compact zoom lens system, which can have a high zoom ratio and a high ability for correcting or reducing chromatic aberration and which is applicable to a digital camera or a video camera.

At least one exemplary embodiment of a digital camera (image pickup apparatus) equipped with the zoom lens system according to at least one exemplary embodiment as a photographic optical system will now be described with reference to FIG. 15.

Referring to FIG. 15, reference numeral 20 denotes a digital-camera body, and reference numeral 21 denotes a photographic optical system defined by the zoom lens system according to at least one exemplary embodiment. Reference numeral 22 denotes a solid-state image sensor (photoelectric transducer), (e.g., a CCD), which optically receives an image of a photographic object via the photographic optical system 21. Reference numeral 23 denotes a memory unit that can store information corresponding to the object image received by the image sensor 22. Reference numeral 24 denotes a viewfinder for observing the object image displayed on a display unit, not shown.

The display unit includes, for example, a liquid crystal panel, and displays the object image formed on the image sensor 22.

By applying the zoom lens system according to at least one exemplary embodiment to an image pickup apparatus, such as a digital camera, a compact image pickup apparatus having high optical performance is achieved.

An embodiment of a video camera (image pickup apparatus) equipped with the zoom lens system according to at least one exemplary embodiment as a photographic optical system will now be described with reference to FIG. 16.

Referring to FIG. 16, reference numeral 10 denotes a video-camera body, and reference numeral 11 denotes a photographic optical system defined by the zoom lens system according to at least one exemplary embodiment. Reference numeral 12 denotes a solid-state image sensor, such as a CCD, which optically receives an image of a photographic object via the photographic optical system 11. Reference numeral 13 denotes a memory unit that can store information corresponding to the object image received by the image sensor 12. Reference numeral 14 denotes a viewfinder for observing the object image displayed on a display unit, not shown. The display unit includes, for example, a liquid crystal panel, and displays the object image formed on the image sensor 12.

By applying the zoom lens system according to at least one exemplary embodiment to an image pickup apparatus, (e.g., a video camera), a compact image pickup apparatus having high optical performance is achieved.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-106353 filed Apr. 1, 2005, which is hereby incorporated by reference herein in its entirety.

What is claimed is:

1. A zoom lens system comprising:
   a first lens unit having positive optical power and including a diffractive optical portion;
   a second lens unit having negative optical power and movable along an optical axis for a zooming operation; and
   a rear lens component including at least one lens unit having positive optical power,
   wherein the first lens unit, the second lens unit, and the rear lens component are arranged in that order from an object side towards an image side of the zoom lens system, and
   wherein the rear lens component includes a positive lens element that satisfies the conditional formula $\nu p \cdot \theta gF > 38$, $\nu p$ representing an Abbe number of a material of the positive lens element, $\theta gF$ representing a partial dispersion ratio of a material of the positive lens element.

2. The zoom lens system according to claim 1, wherein the following conditional formula is satisfied:

$$1 \times 10^{-3} < \phi D/\phi p < 1 \times 10^{-2},$$

where $\phi D$ represents the optical power of the diffractive optical portion, and $\phi p$ represents the optical power of the positive lens element.

3. The zoom lens system according to claim 1, wherein the following conditional formula is satisfied:

$$9 \times 10^{-3} < \phi D/\phi 1 < 1.2 \times 10^{-2},$$

where $\phi 1$ represents the optical power of the first lens unit, and $\phi D$ represents the optical power of the diffractive optical portion.

4. The zoom lens system according to claim 1, wherein the following conditional formula is satisfied:

$$0.5 < \phi 1 \cdot fT < 2.0,$$

where $\phi 1$ represents the optical power of the first lens unit, and fT represents the focal length of the entire zoom lens system at a telephoto end.

5. The zoom lens system according to claim 1, wherein the at least one lens unit in the rear lens component includes a plurality of lens units,
   wherein the positive lens element is included in one of the lens units that is disposed most proximate to the image side.

6. The zoom lens system according to claim 1, wherein the rear lens component includes:
   a third lens unit having positive optical power;
   a fourth lens unit having negative optical power; and
   a fifth lens unit having positive optical power and including the positive lens element,
   wherein the third lens unit, the fourth lens unit, and the fifth lens unit are arranged in that order from the object side towards the image side.

7. The zoom lens system according to claim 6, wherein the following conditional formula is satisfied:

$$0.9 < \phi p/\phi 5 < 2.2,$$

where $\phi p$ represents the optical power of the positive lens element, and $\phi 5$ represents the optical power of the fifth lens unit.

8. The zoom lens system according to claim 1, wherein the rear lens component includes:
   a third lens unit having positive optical power; and
   a fourth lens unit having positive optical power and including the positive lens element,
   wherein the third lens unit and the fourth lens unit are arranged in that order from the object side towards the image side.

9. The zoom lens system according to claim 1, wherein the zoom lens system forms an image on a solid-state image sensor.

10. An image pickup apparatus, comprising:
    the zoom lens system according to claim 1; and
    a solid-state image sensor that optically receives an image formed by the zoom lens system.

* * * * *